Patented May 21, 1935

2,001,702

UNITED STATES PATENT OFFICE 2,001,702

ACYLAMINO-ANTHRAQUINONES AND PROCESS FOR THEIR PREPARATION

Earl Edson Beard, Milwaukee, Wis., assignor to E. I. du Pont de Nemours & Company, Wilmington, Del., a corporation of Delaware No Drawing. Application June 25, 1932, Serial No. 619,278

9 Claims. (Cl. 260—60)

This invention relates to carbon compounds and processes for their production. More particularly it relates to dye intermediates, dyes and colored compounds of the anthraquinone series. It especially contemplates vattable anthraquinone derivatives having the probable formula:

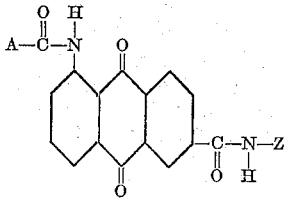

in which A represents a carbon compound radical, residue or nucleus and Z represents a carbon compound, residue or nucleus and the production of such compounds from 1-nitro-anthraquinone-6-carboxylic acid derivatives having the probable formula:

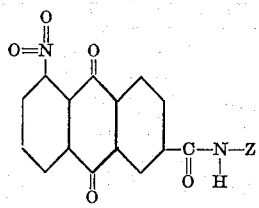

Eckert in 1914 (Monats, für Chemie 35 289) showed that by nitrating anthraquinone-beta-aldehyde and oxidizing the resultant nitro-anthraquinone-aldehyde that the compound 1-nitro-anthraquinone-6-carboxylic acid is produced.

In my copending application Serial No. 590,640, filed February 3, 1932, it is shown that 1-nitro-anthraquinone-6-carboxylic acid can be converted to the corresponding carbonyl halide, for example, 1-nitro-anthraquinone-6-carbonyl chloride and that such carbonyl halide can be condensed with primary and secondary amines to produce 1-nitro-anthraquinone-6-acyl-amino compounds.

An object of this invention is the production of new and valuable chemical compounds. Other objects are to produce new dyes, new dye intermediates, new vat color compounds, new color substances, new chemical processes and in general to advance the art. Other objects will appear hereinafter.

These objects are accomplished by treating 1-nitro-anthraquinone-6-acyl-amino compounds in such a way as to produce 1-amino-anthraquinone 6-acyl-amino compounds and condensing the resultant compound with a carbonyl halide.

The invention will be further understood from a consideration of the following detailed description and specific examples in which the parts are given by weight.

PREPARATION OF 1-AMINO-ANTHRAQUINONE-6-ACYL-AMINO COMPOUNDS

Example I

Ten (10) parts of 1-nitro-anthraquinone-6-carboxylic acid anilide were boiled in 800 parts of water and 50 parts of a 30% sodium sulfhydrate (NaSH) solution for one hour. The nitro group in the compound treated was reduced to an amino group, giving the compound 1-amino-anthraquinone-6-carboxylic acid anilide. This product was filtered from the hot suspension, washed with hot water and dried. The yield was substantially theoretical. If desired the wet filter cake from the preparation of 1-nitro-anthraquinone-6-carboxylic acid anilide may be utilized.

In similar manner other 1-nitro-anthraquinone-6-acyl-amino compounds may be reduced to the corresponding 1-amino-anthraquinone-6-acyl-amino compound.

PREPARATION OF 1-ACYL-AMINO-ANTHRAQUINONE-6-ACYL-AMINO COMPOUNDS

Example II

Ten (10) parts of 1-amino-anthraquinone-6-carbonyl-amino-(1')-anthraquinone and 5 parts of benzoyl chloride were heated together in 200–300 parts of nitrobenzene at 150–160° C. for 2–3 hours. The resultant product was filtered at 50° C. and washed with nitrobenzene and alcohol. The product gives yellow sulphuric acid solutions and dyes cotton in yellow shades from a red-brown hydrosulphite vat.

Example III

Ten (10) parts of 1-amino-anthraquinone-6-carbonyl-amino-(1')-anthraquinone and 5.8 parts of anthraquinone-2-carbonyl chloride were heated together in 200–300 parts of nitrobenzene at 150–160° C. for 2–3 hours. The resultant product was filtered at 50° C., washed with nitro-benzene and alcohol and dried. The product dyes cotton in yellow shades, gives yellow sulphuric acid solutions and red-brown hydrosulphite vats.

Example IV

Ten (10) parts of 1'-amino-6'-anthraquinoyl-benzoyl-1,5-di-amino-anthraquinone were heated with 10 parts of benzoyl chloride in 200–300 parts of nitrobenzene at 150–160° C. for 2–3 hours. The resultant product was filtered at 50° C. and washed with nitrobenzene and alcohol. The resultant dyestuff gives amber to yellow colored sulphuric acid solutions and dyes cotton in yellow shades from a Bordeaux to red-brown colored hydrosulphite vat.

Example V

Ten (10) parts of 1'-amino-6'-anthraquinoyl-amino-6-chloro-anthraquinone were heated with 5 parts of benzoyl chloride in 200–300 parts of nitrobenzene at 150–160° C. for 2–3 hours. The resultant product was filtered at 50° C. and washed with nitrobenzene and alcohol. The product dissolves in sulphuric acid with an orange-yellow color and dyes cotton in yellow shades from a red colored hydrosulphite vat.

Example VI

Ten (10) parts of 1'-amino-6'-anthraquinoyl-amino-6-chloro-anthraquinone were heated with 5.5 parts of anthraquinone-2-carbonyl chloride in 200–300 parts of nitro-benzene at 150–160° C. for 2–3 hours. The solid product was filtered at 50° C. washed with nitrobenzene and alcohol and dried. This dyestuff gives orange-yellow sulphuric acid solutions when dissolved therein and dyes cotton in yellow shades from a brown-red vat.

Example VII

Ten (10) parts of di-(1'-amino-6'-anthraquinoyl)-1,5-di-amino-anthraquinone were treated with 10 parts of benzoyl chloride in 300 parts of nitrobenzene at 160° C. for 2–3 hours. The resultant product was filtered at 70° C. The cake was washed with nitrobenzene and alcohol and finally dried. This dyestuff gives a yellow sulphuric acid solution color and from a Bordeaux to brown colored hydrosulphite vat dyes cotton in yellow shades.

Example VIII

Ten (10) parts of di-(1'-amino-6'-anthraquinoyl)-1,5-di-amino-anthraquinone were heated in 500 parts of nitrobenzene at 160° C. with 8.3 parts of 1:9-anthraisothiazole-2-carbonyl chloride for 3 hours. The resultant condensation product was filtered at 80–90° C. and washed with nitrobenzene, alcohol and thereafter dried. The resultant material was a dyestuff giving yellow to orange sulphuric acid solutions, dyeing cotton in golden-orange shades and from a blue colored hydrosulphite vat.

Example IX

Ten (10) parts of di-(1'-amino-6'-anthraquinoyl)-1,5-di-amino-4-hydroxy-anthraquinone were heated in 400 parts of nitrobenzene at 160° C. with 10 parts of benzoyl chloride for 2–3 hours. The resultant product was filtered at 80° C., washed with nitrobenzene, alcohol and finally dried. The product gives orange colored sulphuric acid solutions when dissolved therein and from red colored hydrosulphite vats dyes cotton in orange shades.

Example X

Ten (10) parts of di-(1'-amino-6'-anthraquinoyl)-1,4-di-amino-anthraquinone were heated in 350 parts of nitrobenzene at 155° C. with 7 parts of benzoyl chloride for 2 hours. The resultant condensation product was filtered at 70° C., washed with nitrobenzene and alcohol and finally dried. The product gives orange colored sulphuric acid solutions when dissolved therein and gives red-brown hydrosulphite vats from which cotton is dyed in orange shades.

Example XI

Ten (10) parts of 1'-amino-6'-anthraquinoyl-benzoyl-1,5-di-amino-anthraquinone were heated in 250 parts of nitrobenzene at 155° C. with 4 parts of anisyl chloride for 2 hours. The product was filtered at 65° C., washed with nitrobenzene, alcohol and dried. This dyestuff gives an orange to yellow sulphuric acid solution color and dyes cotton in an orange-yellow shade from a Bordeaux-red colored hydrosulphite vat.

Example XII

Ten (10) parts of 1'-amino-6'-anthraquinoyl-anisyl-1,5-di-amino-anthraquinone were heated in 250 parts of nitrobenzene at 150° C. with 7 parts of benzoyl chloride for 3 hours. The condensation product was filtered at 70° C., washed with nitrobenzene and alcohol and thereafter dried. The resultant dyestuff gives an orange-yellow sulphuric acid solution color, dyes cotton in orange-yellow shades from a Bordeaux to red-brown colored hydrosulphite vat.

Example XIII

Ten (10) parts of 1-amino-6-anthraquinoyl-amino-(Bzl)-benzanthrone were heated with 5 parts of benzoyl chloride in 300 parts of nitrobenzene at 150–160° C. for 2–3 hours. The resultant product was filtered at 70° C. and washed with nitrobenzene and alcohol. It was thereafter dried. The dyestuff gives an orange-yellow sulphuric acid solution color and dyes cotton in yellow shades from a red-brown hydrosulphite vat.

Example XIV

Ten (10) parts of 1-amino-6-anthraquinoyl-amino-(Bzl)-benzanthrone were heated with 6.1 parts of 1,9-anthraisothiazole-2-carbonyl chloride in 400 parts of nitrobenzene at 150–160° C. for 2–3 hours. The product was filtered at 80° C., washed with nitrobenzene, thereafter washed with alcohol and finally dried. The resultant dyestuff gives an orange-yellow sulphuric acid solution color and a blue hydrosulphite vat from which it dyes cotton in yellow shades.

Example XV

Ten (10) parts of 1-amino-anthraquinone-6-carbonyl-amino-(1')-4'-methoxy-anthraquinone were heated with 5 parts of benzoyl chloride in 250 parts of nitrobenzene at 145–150° C. for 2 hours. The product was filtered at 60° C. It was thereafter washed with nitrobenzene which washing was followed with a washing utilizing ethyl alcohol and the product finally dried. The dyestuff gives an orange-yellow sulphuric acid solution color and dyes cotton in orange-yellow shades from a red-brown colored hydrosulphite vat.

Example XVI

Ten (10) parts of 1-amino-anthraquinone-6-carbonyl-amino-(1')-4'-methoxy-anthraquinone were heated with 6 parts of 1,9-anthraisothiazole-2-carbonyl chloride in 300 parts of nitrobenzene at 155–165° C. for 2 hours. The product was filtered at 80° C., washed with nitrobenzene, alcohol and dried. The resultant compound gives an orange-yellow sulphuric acid solution color and dyes cotton in orange-yellow shades from a blue colored hydrosulphite vat.

Example XVII

Ten (10) parts of di-(1'-amino-6'-anthraquinoyl)-1,5-di-amino-4,8-di-hydroxy-anthraquinone were heated with 10 parts of benzoyl chloride in 400 parts of nitrobenzene at 160° C. for 1½–2 hours. The benzylated product was filtered at 70° C., washed with nitrobenzene and alcohol and finally dried. The resultant dyestuff gives a brown sulphuric acid solution color and dyes cotton in Bordeaux to Violet shades from a red-brown hydrosulphite vat.

Example XVIII

Ten (10) parts of di-(1-amino-6-anthraquinoyl)-meta-di-amino-benzene were heated with 10 parts of benzoyl chloride in 150 parts of nitrobenzene at 150° C. for 1–2 hours. The dyestuff was filtered at 50° C., washed with alcohol and dried. This product gives yellow sulphuric acid solutions, dyes cotton in yellow shades and forms red-brown hydrosulphite vats.

Example XIX

Ten (10) parts of 1-amino-anthraquinone-6-carboxylic acid anilide were condensed with 2.9 parts of terephthalic acid chloride by heating these two products together for 2 hours in 300 parts of nitrobenzene at 150° C. The resultant dyestuff was filtered at 60° C., washed with nitrobenzene and alcohol and dried. This product gives a yellow sulphuric acid solution color and dyes cotton in yellow shades from a brown colored hydrosulphite vat.

Example XX

Ten (10) parts of 1-amino-6-anthraquinoyl-amino-(1')-anthraquinone-5'-amine was acidylated by heating with 10 parts of ortho-chlorobenzoyl chloride in 250 parts of nitrobenzene at 160° C. for 2 hours. The resulting dyestuff was filtered at 65° C., washed with nitrobenzene and alcohol and dried. This product gives a yellow sulphuric acid solution color and forms red-brown hydrosulphite vats from which cotton is dyed in yellow shades.

The invention is not limited to the materials specified in the examples. So far as now appears any carbonyl halide may be condensed with the 1-amino-anthraquinone-6-acyl-amino compounds. Other equivalent carbonyl halides which merit special mention are, acetyl chloride, acetyl bromide, chloro-acetyl chloride, propionyl bromide, succinyl chloride, oxalyl chloride, benzoyl chloride, toluic acid chloride, ortho-chloro-benzoyl chloride, benzoyl bromide, the anisyl chlorides, the nitrobenzoyl chlorides, terephthaloyl chloride, iso-phthalic acid chloride, alpha-naphthoyl chloride, beta-naphthoyl chloride, beta-anthraquinone-carbonyl chloride, beta-anthraquinone-carbonyl bromide, 1-amino-anthraquinone-2-carbonyl chloride, 1-amino-anthraquinone-6-carbonyl chloride, 1-chloro-anthraquinone-2-carbonyl chloride, 1-chloro-anthraquinone-6-carbonyl chloride, 1,9-anthra-isothiazole-2-carbonyl chloride, 1,9-anthraisothiazole-4-carbonyl chloride, 1,9-anthraisothiazole-5-carbonyl chloride, 1,9-anthraisoselenazole-2-carbonyl chloride, 1,9-anthraisothiophene-2-carbonyl chloride, 1-nitro-anthraquinone-2-carbonyl chloride, 1-nitro-anthraquinone-6-carbonyl chloride, anthraquinone-2,1-phenyl-acridone-4'-carbonyl chloride, 1,9-anthraisothiazole-amine-(2)-1'-anthraquinone-6-carbonyl chloride, 1,9-anthraisoselenazole-amino-(2)-1'-anthraquinone-6-carbonyl chloride, and anthraquinone-2,1-phenyl-acridone-4'-carbonyl-amino-1''-anthraquinone-6''-carbonyl chloride. Benzoyl chloride and the homologous series derivatives thereof, formed by the substitution of one or more halogen, alkyl or alkoxy groups in the benzene nucleus, are particularly valuable.

As will be obvious from the above, A and Z in the general formula set out in the first part of the specification may represent any organic radical, residue or nucleus.

In the course of the specification certain formulae have been given for the purpose of aiding and understanding the invention. These formulae have not been proven except by the processes herein described and therefor it is not desired to limit the invention by the same.

As will be clear from the examples, the amount of solvent or suspension agent (if any) used for carrying out the reaction may be varied over a wide range depending largely upon the characteristics of the particular condensation or conversion being carried out and the convenience of the person carrying out the reaction. Particular mention may be made of such solvents or suspension agents as nitrobenzene, chlorobenzenes, toluene, xylene, naphthalene and the like.

The particular temperatures and time utilized for the various condensations and conversions also depend upon the characteristics of the substances being treated. Temperatures higher than ordinary room or atmospheric temperatures are usually used because of the influence of temperature on the speed of the reaction. High yields to some extent depend upon selected temperature ranges which may be readily determined by the person carrying out the reaction. Obviously temperatures high enough to cause substantial decomposition of the reactants would not be economical.

The solvent, temperature, time and other features of the invention, such as the conversion and condensation, which are most desirable for any particular reaction, may be readily determined empirically by one skilled in the art.

Throughout the specification and claims the term "vat color" is used to cover compounds susceptible to vatting by any of the methods known to the art. It includes vat dyes and vattable compounds which are not dyes and vattable compounds which have no affinity for fiber.

The subject matter of the specification involves an entirely new field of anthraquinone vat colors. The compounds produced have very desirable properties. While the shade of these compounds varies with the particular constitution, it may be stated that in general the colors fall within the range, orange, yellow and brown.

As many apparently widely different embodiments of this invention may be made without departing from the spirit and scope thereof, it is to be understood that I do not limit myself to the specific embodiments thereof except as defined in the appended claims.

I claim:

1. The process which comprises condensing a 1-nitro-anthraquinone-6-carbonyl halide with an amine containing at least one hydrogen atom attached to the amine nitrogen atom, converting the resultant to the corresponding 1-amino-anthraquinone-6-acyl-amino compound and condensing the last mentioned compound with a carbonyl halide.

2. The 1-acyl-amino-anthraquinone-6-acyl-amino-compound which is substantially identical with that obtainable by condensing a 1-nitro-anthraquinone-6-carbonyl chloride with an amine having at least one hydrogen atom attached to the amine nitrogen atom, converting the resultant to the corresponding 1-amino-anthraquinone-6-acyl-amino compound and condensing the last mentioned compound with a carboxylic acid halide of the benzene series.

3. The process which comprises condensing a 1-nitro-anthraquinone-6-carbonyl halide with an amine, converting the resultant to the corresponding 1-amino-anthraquinone-6-acyl-amino compound.

4. The process which comprises condensing a 1-nitro-anthraquinone-6-carbonyl halide with an amine, converting the resultant to the corresponding 1-amino-anthraquinone-6-acyl-amino compound and condensing the last mentioned compound with a carbonyl halide.

5. The process which comprises condensing a 1-amino-anthraquinone-6-acyl-amino compound with a carbonyl halide.

6. The compound 1-benzoyl-amino-5, 1'-benzoyl-amino-6'-anthraquinoyl-amino-anthraquinone, which is a yellow solid giving amber to yellow colored sulfuric acid solutions and Bordeaux to red-brown colored hydrosulfite vats from which cotton may be dyed in yellow shades.

7. The compound 1-benzoyl-amino-anthraquinone-6-carbonyl-amino-(1')-4'-methoxy-anthraquinone which is an orange-yellow solid giving an orange-yellow sulfuric acid solution, and red-brown colored alkali-metal-hydrosulfite vats from which cotton may be dyed orange-yellow shades.

8. The compound di-(1'-benzoyl-amino-6'-anthraquinoyl) - 1,4 - di - amino - anthraquinone which is an orange solid, giving orange sulfuric acid solutions and red-brown sodium hydrosulfite vats from which cotton may be dyed orange shades.

9. The anthraquinone-6-acyl-amino compound obtainable by condensing 1-nitro-anthraquinone-6-carbonyl-chloride with an amine and reducing the nitro group in the resultant product to an amino group and in which the 1-amino radical may be acylated.

EARL EDSON BEARD.